Jan. 5, 1954   B. A. RASMUSSEN   2,665,143
PASSENGER SAFETY BELT DEVICE FOR AUTOMOBILES
Filed Nov. 23, 1949   2 Sheets-Sheet 1
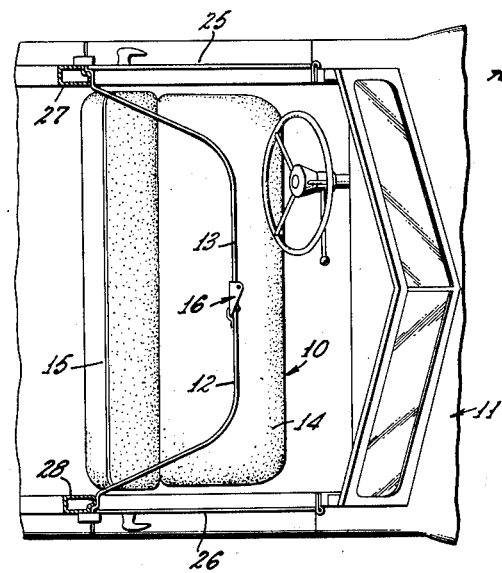
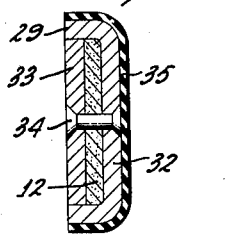
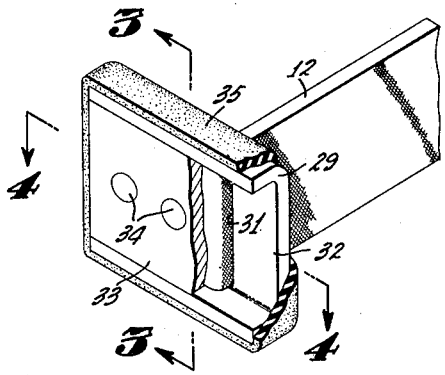
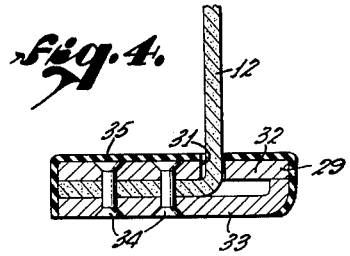
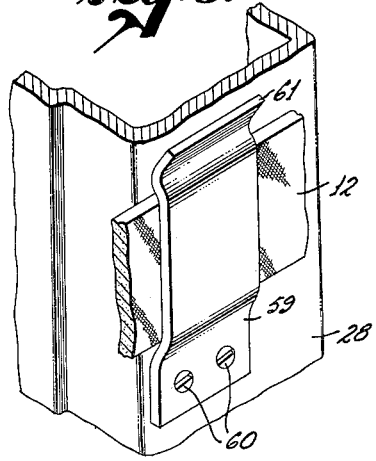
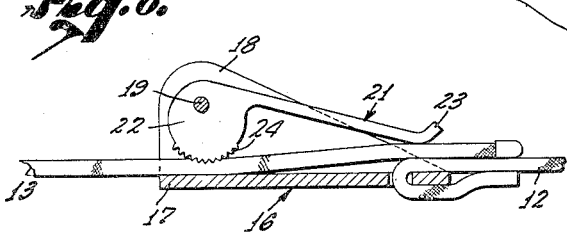
BORGE A. RASMUSSEN,
INVENTOR.
ATTORNEY.

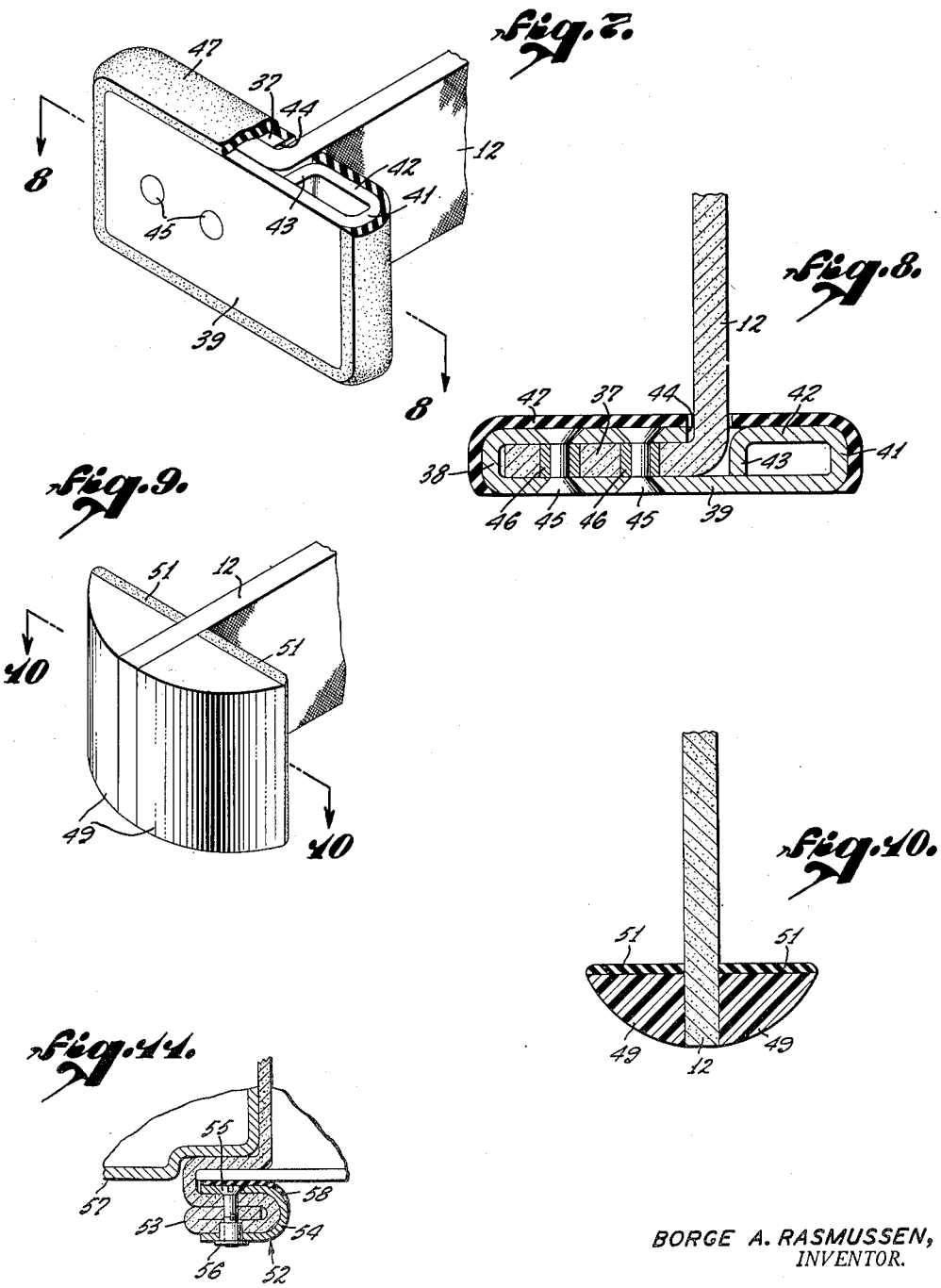

Patented Jan. 5, 1954

2,665,143

UNITED STATES PATENT OFFICE 2,665,143

PASSENGER SAFETY BELT DEVICE FOR AUTOMOBILES

Borge A. Rasmussen, Los Angeles, Calif.

Application November 23, 1949, Serial No. 128,969

3 Claims. (Cl. 280—150)

This invention relates to safety devices for vehicles and more particularly to a safety device which may be passed in front of an occupant of the vehicle to prevent the occupant from being thrown forwardly out of the seat in case of a sudden stop or collision.

The safety device of the present invention comprises a pair of belt sections, the opposite ends of which are securely anchored to stress-carrying members of the vehicle frame and the inner or adjacent ends are formed with means for adjustable interconnecting the same. Safety devices of the type herein shown have been previously proposed for use in passenger vehicles such as automobiles, but for various reasons have not been adopted. Such devices, however, have been long used in aircraft and the safety features thereof are well recognized.

Many of the devices previously proposed for use in passenger automobiles have not been practical. This is particularly true of those prior devices which were fastened to the seat itself for as the forces produced by deceleration of the automobile oftentimes produced a failure of the seat securing means, these devices consequently did not prevent the occupant of the seat from being thrown forwardly with the seat.

Other devices heretofore proposed were also defective in that the means anchoring the belt sections were not sufficiently rugged to withstand the force of the impact when the occupant of the seat was thrown against the belt when the automobile was suddenly stopped by an application of the brakes thereof or because of a collision.

Another reason why safety devices of the type herein shown have not been adopted and used in passenger automobiles, is that many of these devices were complicated and difficult to install in an automobile. This is not true of the safety belt of the present invention, for the ends of the belt sections may be securely anchored without the use of any anchoring devices attached to or mounted to the seat structure or the frame of the automobile. This, as will be appreciated, eliminates one of the disadvantages of prior devices.

The belt sections are mounted according to the present invention, by securing to the outer ends of the belt section stress-taking protuberances and to anchor the safety belt sections it is only necessary to extend the outer ends of the belt sections through the door openings. The safety belt formed by the sections will be securely anchored for the protuberances prevent the outer ends of the belt sections from being withdrawn or pulled into the interior body of the automobile once the doors are closed.

As all loads induced in the belt by an occupant being thrown forwardly against the belt are carried into the door and post structure of the automobile, there is no danger of the device failing in use as there is with those previously proposed devices anchored to the seat structure itself.

As the belt sections of the device of the present invention are not permanently secured to the seat structure or frame of the automobile, they can be easily rolled up and stored within the glove compartment of the automobile, for example, when they are not in use. A further feature of the safety device of the present invention resides in the fact that the belt sections can be mounted so that the belt is either a chest or lap belt. If the outer ends of the belt are passed through the door openings substantially equal to the chest height of an occupant of the seat of the vehicle, the device becomes a chest belt. On the other hand, if the belt sections are passed at a lower point through the door openings, the device becomes a lap belt.

To prevent the belt sections from dropping to the lower edge of the door opening each time a door is opened, a retaining member may be used to hold the portion of the belt passed through the door opening at some pre-selected position. This means, in the preferred embodiment of the invention, comprises a relatively flat leaf spring secured at its lower edge to the door post. As the upper end of the leaf spring is not secured to the post, the belt section can be readily inserted between the spring and the door post. The spring, although it will prevent the belt section from dropping when the door is opened, nevertheless permits longitudinal movement of the belt section so that the protuberances carried by the outer ends of the belt section can be drawn snugly against the outer surface of the car body after the doors are closed.

Other features and advantages of the present invention will be hereinafter apparent from the detailed description of the illustrated embodiment of the invention, particularly when taken in connection with the accompanying drawing, in which:

Figure 1 is a plan view, partly in section, of an automobile showing the device of the present invention in use;

Figure 2 is a perspective view of the outer end of one embodiment of the belt section of the present invention;

Figure 3 is a section taken along line 3—3 of Figure 2;

Figure 4 is a section taken along line 4—4 of Figure 2;

Figure 5 is a fragmentary perspective view showing the spring-retaining member;

Figure 6 is a sectional view showing one form of a buckle for securing the adjacent ends of the belt sections together;

Figure 7 is a perspective view, partly in section, showing a modified form of the protuberance or anchoring member;

Figure 8 is a section taken along line 8—8 of Figure 7;

Figure 9 is a view somewhat similar to Figure 7 but showing a modified form of the protuberance or anchoring element;

Figure 10 is a section taken along line 10—10 of Figure 9; and

Figure 11 is a sectional view of a portion of an automobile showing mounted thereto a belt section carrying another form of the anchoring element.

The safety device of the present invention, referring now to the accompanying drawings, and more particularly to Figure 1 thereof, in which there is shown an application of the invention to the front seat 10 of an automobile 11, comprises a pair of belt sections 12 and 13 adapted to be arranged across the body 14 of the seat just in front of the seat back 15. The adjacent ends of the belt sections 12 and 13 are adapted to be adjustably interconnected through an interconnecting means, such as the buckle 16. Any buckle desired may be used, although there is shown in Figure 6 the now preferred form of the buckle mechanism, which comprises a plate member 17 secured to the belt section 12 and formed at opposite sides with ears or lugs 18 receiving the ends of a shaft 19. The shaft 19 is rotatably supported between the ears 18 and carries an actuator 21 including a substantially cylindrical member 22 and a laterally extending arm 23. The member 22 is eccentrically mounted to the shaft 19 and is spring urged to a position in which a plurality of teeth 24 formed along one side thereof are in the position shown in Figure 6.

The adjacent or inner end of the belt section 13 carries a tip member which when forced between the member 22 and the plate 17 will rock the former in a counterclockwise direction as viewed in Figure 6 and because of the eccentric mounting of the member 22, the teeth 24 will be moved away from the plate 17. The belt section 13 can thereafter be freely moved to the right through the buckle but any force tending to move the section 13 to the left will result in clockwise movement of the member 22 and move the teeth 24 into holding engagement with the section 13. It should be seen now that when the arm 23 is swung in a counterclockwise direction, the eccentricity of the cylindrical member 22 will move the teeth 24 out of engagement with the belt section 13 to allow the latter to be withdrawn from the buckle.

The belt sections 12 and 13, when interconnected through the buckle 16, form a safety belt having a length somewhat longer than the width of the seat 10. To mount the outer or opposite ends of the belt sections 12 and 13, it has been heretofore proposed to permanently secure to either the seat structure or to the frame members of the vehicle, some anchoring means to which the belt sections were permanently secured. Where the belt sections were secured to the seat proper, the strains set up in the seat upon a sudden stop or a collision, oftentimes tore the seat structure loose from the floorboards of the vehicle, resulting in the driver or the passenger being thrown forwardly against the instrument panel of the vehicle, even though the safety belt remained secured to the seat proper. This disadvantage was not had where the belt sections were permanently anchored to the frame members of the vehicle, although this mounting of the safety belt not only complicated its use but also interfered with the free ingress and egress from the car itself.

In the safety device of the present invention, although the belt sections are anchored to the frame members in such a manner that all stresses set up in the belt sections when a body is thrown against the same are taken by the frame members of the vehicle, the belt sections are not permanently anchored to the frame members and since the belt sections are made of pliant, non-resilient material, they can be rolled up and stored whenever it is desired not to use the same.

The means for anchoring the outer or opposite ends of the belt section to the frame member of the vehicle, in the now preferred form of the invention, comprises stress-resisting protuberances securely fixed to the outer ends of the belt sections. The outer ends of the belt sections are passed through the door openings, closed by the doors 25 and 26 at opposite ends of the seat 10. After the doors 25 and 26 are closed, the outer end portions of the two belt sections extend between the doors and the frame members or door posts 27 and 28 defining in part the door openings closed by doors 25 and 26. As the protuberances secured to the outer ends of the belt sections 12 and 13 are of a length greater than the width of the clearance between the edges of the doors 25 and 26 and the faces of the frame members 27 and 28, the protuberances will hold the outer ends of the belt sections from being drawn inwardly of the vehicle after the doors have been moved to their closing position.

The means secured to the outer ends of the belt sections 12 and 13 and which form the protuberances, may take different forms. In the embodiment of the invention shown in the Figures 2 through 4, the protuberance carried by each belt section is formed by means comprising a channel shaped member 29 having a transversely extending slot 31 formed in the web 32 thereof for passing the extreme end portion of the belt section. The portion of the belt section passed through the slot 31 is then bent over to overlay the one face of the web or transverse wall member 32 and held in position thereagainst by a plate 33 secured to the transverse wall 32 by a plurality of rivets 34. If desired, one or both ends of the plate can be formed with a flange of a length substantially equal to the thickness of the belt section. It will be seen now, referring to Figure 4, that the rivets 34, when upset, will clamp the end portion of the belt section passed through the slot 31 between the plate 33 and the transverse wall 32 of the channel shaped member 29.

When the safety device of the present invention is put into use, it is only necessary to pass the outer ends of the belt sections 12 and 13 through the openings closed by the doors 25 and 26, after which the doors may be moved to their fully closed position. With the doors fully closed, the belt sections 12 and 13 can be drawn inwardly to bring the protuberances formed by the channel shaped member 29 into engagement with the exterior surface of the vehicle formed by the outer surface of the frame members 27 and 28 and the contiguous areas of the doors 25 and 26.

To prevent the protuberances from scratching or otherwise marring the finish of the body of the vehicle, a resilient or cushioning member 35 may be mounted to the channel shaped member 29, as seen in Figure 2, which resilient member, in the use of the device, will be interposed between the channel shaped member 29 and the exterior of the vehicle body. As the member 35 may be formed of rubber or other like resilient material, there is no danger that the channel shaped member 29 will mar the body of the vehicle when the belt sections are drawn inwardly to bring the channel shaped member into snug engagement with the body.

After the outer ends of the belt sections have been anchored as above described, the buckle 16 can be manipulated to properly adjust the length of the safety belt formed by the interconnected belt sections to hold the belt in the desired relationship with the driver as well as any passengers seated on the front seat of the vehicle.

One of the features of the present invention resides in the fact that the belt is not permanently anchored in position and can therefore be adjusted so that the belt when anchored will form either a chest belt or a lap belt. This is so for if a chest belt is desired, the belt sections are passed through the door openings at a point which corresponds to the chest level of the driver or passengers occupying the seat. If the driver or passengers desire a lap belt, the point at which the outer ends of the belt sections are passed through the door openings will, of course, be lower than those points necessary for a chest belt.

Although the protuberances carried by the outer ends of the belt sections are disposed exteriorly of the vehicle when the device is in use, and will therefore be visible, they need not detract from the appearance of the vehicle, for the exposed faces of the plate 33, as well as the edge faces of the channel member 29, can be finished in a color which matches the color of the exterior of the vehicle. With the exposed portions of the protuberances so colored, the protuberances will not be visible or apparent to a casual observer of the vehicle.

There is shown in Figure 7 a modified form of the means forming the stress-taking protuberances secured to the outer ends of the belt sections. In this form of the invention, a strap is first bent adjacent its one end portion 37 to form a laterally extending arm 38, which is in turn bent to overlay the strap to form an intermediate section 39 substantially parallel with the end portion 37. The section 39 is then reversely bent over on itself to form a laterally extending arm 41 of the same length as the arm 38, and a segment 42 projecting toward the end portion 37 and substantially coplanar therewith. The extreme end of the segment 42 is then laterally bent to form a finger 43 substantially equal to the distance between the adjacent faces of the end portion 37 and the section 39. As the finger 43 is spaced from the adjacent end portion 37, the strap formed as above described produces an open-ended member having a transversely extending slot 44 in the one wall thereof. The slot 44 permits the outer end of the belt section to be introduced within the member and thence into a position as shown in Figure 8. The end portion 37 and a part of the section 39 are each formed with aligned apertures for passing rivets 45, as is also the end of the belt section received between the end portion 37 and the section 39. The apertures of the belt section carry bushings 46 through which the rivets 45 coaxially extend. After the ends of the rivets 45 have been upset, it will be seen that the end of the belt section is securely mounted within the member formed by the strap. In this form of the invention, the members form the protuberances carried by the ends of the belt sections and which prevent the ends of the belt section from being drawn inwardly of the vehicle.

As the members will be brought into engagement with the body of the vehicle, and as there is a likelihood that the same will mar the finish of the body, it is preferred to cover at least the surface of the protuberance engaged with the body of the vehicle with a soft resilient sheath 47. This sheath, in the embodiment of the invention illustrated in Figures 7 and 8, comprises a molded box-like member for covering all but the exposed face of the section 39 of the strap. Here again the exposed surface of the protuberance, in this embodiment the one face of the section 39, can be coated with a paint, lacquer, or the like, matching the lacquer or paint of the vehicle body.

In the embodiment of the invention as shown in Figures 9 and 10, the protuberance is formed by a pair of plastic members 49 heat and pressure-bonded to the opposite surface of each belt section adjacent the outer end thereof. The plastic elements need not be of any particular shape, although they should have a width equal to the width of the belt section. To more evenly distribute the stresses which would be set up in the plastic sections when a body was thrown against the belt, it is preferred to have the face of the sections which engage the exterior of the vehicle body substantially flat. To this flat surface can be secured small plates 51 of some resilient material, such as rubber, to obviate any possibility of the hard plastic sections marring the surface of the vehicle when the belt is pulled inwardly to bring the protuberance formed by the plastic section into snug engagement with the outer surface of the car body.

It should be understood that the bond between the members 49 and the ends of the belt sections should be sufficiently strong to prevent the members from being pulled off the sections if a passenger or the driver was thrown against the belt in use. As the belt is a woven one and consequently is inherently formed with a plurality of interstices, the plastic material during the heat and pressure bonding operation tends to flow into these interstices to very securely anchor the members 49 to the belt.

In the embodiment of the invention as shown in Figure 11, the protuberance 52 is formed by folding the outer end portion of each belt section 53 as shown. To hold the folded sections of the belt against separation, a substantially U-shaped casing 54 is slipped over the folds and held in place thereon by one or more bolts 55 passed through aligned openings formed in the opposite walls of the casing as well as in the folds of the belt section. A nut 56, threadedly mounted to the shank of each bolt, securely holds the casing in position about the folds.

In use, the protuberance formed by the folds housed within the casing 54 tends to assume the position shown in Figure 11 after the belt section is pulled inwardly to bring the protuberance into snug engagement with the exterior of the body 57 of the automobile. As the belt section 53 is pliant and as the belt section is not rigidly held against longitudinal movement, the protuberance is swung in a counterclockwise direction, as viewed in Figure 11, by the door as the same is swung outwardly in the opening movement thereof.

A plate-like member 58 of some resilient material, such as rubber, is preferably bonded to at least a part of the exterior of the surface of the casing 54 to protect the surface of the body of the automobile engaged by the casing.

It should be understood now that in all embodiments of the present invention herein illustrated, the belt is anchored in position by merely closing the door upon the outer extremities of the two belt sections. The protuberances which prevent the belt sections from being drawn inwardly through the door openings after the doors are closed, not only securely anchor the belt sections to the frame elements of the body, but also will transmit forces to these frame elements if the driver or a passenger is thrown against the belt.

The particular manner in which the belt sections are anchored obviates the necessity of any mechanical changes to either the seat structure itself or the frame of the vehicle. As the belt sections are not permanently anchored to the seat or to the frame elements of the vehicle, any time the belt is not required or desired to be used, the belt sections can be easily rolled up and stored in some convenient storage area, such as the glove compartment of the vehicle. This is a decided advantage to a driver making a plurality of stops after relatively short drives, such as a salesman calling on customers, for the belt in no way hampers his movements getting into or leaving his vehicle.

To obviate the end of the belt section from dropping downwardly through the action of gravity when the door holding the belt section in place is opened, a retaining member may be attached to a frame member or door post. Although this retaining member may take different forms, it is now preferred to use the retaining member shown in Figure 5 of the drawing. This retaining member comprises a resilient leaf 59 which is secured at its lower edge by conventional securing means, such as the screws 60 shown, to the one face of the door post or frame member 27. As the lower edge only of the leaf spring 59 is secured to the exposed face of the door post, a belt section can be easily inserted between the leaf spring and the exposed face of the door post 27 by slipping the belt section downwardly therebetween. To facilitate this insertion, the upper edge of the leaf spring 59 is preferably bent outwardly as indicated at 61 to form a bell-shaped mouth into which the belt section can be easily inserted. Although the leaf spring 59 will hold the belt section from dropping by gravity when a door is opened, it does not in any way restrict longitudinal movement of the belt section so that after the door is closed the belt section can be drawn inwardly until the protuberance carried by the outer end thereof is brought into engagement with the exterior of the car body. It will be appreciated that when the belt is desired to be stored, the belt is easily released from the retaining member formed by the leaf spring by merely giving the belt section a sharp tug upwardly to disengage it from its position between the leaf spring and the exposed face of the door jamb to which the leaf spring is secured.

Although the now preferred embodiments of the present invention have been shown and described herein, it is to be understood that the present invention is not to be limited thereto for it is susceptible to changes in form and detail within the scope of the appended claims.

I claim:

1. A safety device of the type described, for the seat of a vehicle having doors adapted to close openings at opposite sides thereof, comprising: a pair of belt sections of pliant non-resilient material adapted to be longitudinally arranged across said seat; and means carried by the adjacent ends of said belt sections for adjustably interconnecting said adjacent ends to form a belt of a length greater than the length of said seat whereby the outer ends of said belt sections may be extended outwardly through the door openings, the outer end of each section being folded at least once upon itself and; means for holding the folds against movement to form a fixed protuberance thereon of a size larger than the clearance between a door and the opening closed thereby, and engageable with the exterior of said vehicle for holding the outer end of each belt section against inward movement after each door is moved to its closed position.

2. A safety device of the type described, for the seat of a vehicle having doors adapted to close openings at opposite sides thereof, comprising: a pair of belt sections of pliant non-resilient material adapted to be longitudinally arranged across said seat; means carried by the adjacent ends of said belt sections for adjustably interconnecting said adjacent ends to form a belt of a length greater than the length of said seat whereby the outer ends of said belt sections may be extended outwardly through the door openings; the outer end of each section being folded at least once upon itself; rigid means embracing said folded portion of each section; and means for securing said embracing means to said folded portion to form a protuberance on the outer end of each section of a size larger than the clearance between a door and the opening close thereby; and engageable with the exterior surface of said vehicle body for holding the outer end of each belt section against inward movement after each door is moved to its closed position.

3. A safety device of the type described, for the seat of a vehicle having doors adapted to close openings at opposite sides thereof, comprising: a pair of belt sections of pliant, non-resilient material adapted to be longitudinally arranged across said seat; means carried by the adjacent ends of said belt sections for adjustably interconnecting said adjacent ends to form a belt of a length greater than the length of said seat whereby the outer ends of said belt sections may be extended outwardly through the door openings; the outer end of each section being folded at least once upon itself; rigid means embracing said folded portion of each section; means for securing said embracing means to said folded portion to form a protuberance on the outer end of each section of a size larger than the clearance between a door and the opening closed thereby, and engageable with the exterior surface of said vehicle body for holding the outer end of each belt section against inward movement after each door is moved to its closed position; and a resilient sheath enclosing at least the face of each protuberance engageable with the exterior surface of the vehicle body.

BORGE A. RASMUSSEN.

References Cited in the file of this patent

UNITED STATES PATENTS

| Number | Name | Date |
|---|---|---|
| 292,940 | Nickerson | Feb. 5, 1884 |
| 338,846 | Kimber | Mar. 30, 1886 |
| 1,841,954 | Jellineck | Jan. 19, 1932 |
| 1,973,011 | Morrison | Sept. 11, 1934 |
| 2,345,381 | Chenette | Mar. 28, 1944 |
| 2,480,915 | George | Sept. 6, 1949 |

FOREIGN PATENTS

| Number | Country | Date |
|---|---|---|
| 12,165 | Australia | Feb. 28, 1934 |